(12) United States Patent
Saranathan et al.

(10) Patent No.: US 11,243,988 B2
(45) Date of Patent: Feb. 8, 2022

(54) DATA CURATION ON PREDICTIVE DATA MODELLING PLATFORM

(71) Applicant: INTERNATIONAL BUSINESS MACHINES CORPORATION, Armonk, NY (US)

(72) Inventors: Sundar Saranathan, Framingham, MA (US); Achille B. Fokoue-Nkoutche, White Plains, NY (US); Alix Lacoste, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/203,960

(22) Filed: Nov. 29, 2018

(65) Prior Publication Data

US 2020/0175045 A1 Jun. 4, 2020

(51) Int. Cl.
*G06F 16/00* (2019.01)
*G06F 16/31* (2019.01)
(Continued)

(52) U.S. Cl.
CPC .......... *G06F 16/313* (2019.01); *G06F 16/215* (2019.01); *G06F 16/288* (2019.01); *G06F 16/338* (2019.01); *G06N 5/022* (2013.01)

(58) Field of Classification Search
CPC ...... G06F 16/36; G06F 16/248; G06F 16/285; G06F 16/958; G06F 16/9038; G06F 16/9535; G06F 40/295; G06F 40/30; G06F 16/338; G06F 16/951; G06F 19/00; G06F 16/24568; G06F 16/254; G06F 16/9024; G06F 16/21; G06F 16/22; G06F 16/2453; G06F 16/24542; G06F 16/24545; G06F 16/2455; G06F 16/24578; G06F 16/25; G06F 16/316; G06F 16/328; G06F 16/3326; G06F 16/3329; G06F 16/3338; G06F 16/334; G06F 16/3344; G06F 16/34; G06F 16/35; G06F 16/355; G06F 16/358; G06F 19/32; G06F 19/324; G06F 19/325; G06F 40/10; G06F 40/174; G06F 40/211; G06F 40/247; G06F 40/268; G06F 40/284; G06F 40/289; G06F 40/35; G06F 16/583; G06F 16/313; G06F 16/51; G06F 16/58; G06F 16/243; G06F 16/26; G06F 16/3334;
(Continued)

(56) References Cited

U.S. PATENT DOCUMENTS 10,282,720 B1 * 5/2019 Buibas ............... G06K 9/00342
2011/0213742 A1 * 9/2011 Lemmond ........... G06F 16/3344
706/13

(Continued)

OTHER PUBLICATIONS

Wikipedia, "Active learning (machine learning)," https://en.wikipedia.org/wiki/Active_learning_(machine_learning), Printed on Nov. 16, 2017, pp. 1-3.

*Primary Examiner* — Shyue Jiunn Hwa
(74) *Attorney, Agent, or Firm* — David Spalding

(57) ABSTRACT

A method, system, and computer program product for a data modelling platform to engage with a user via a user interface is provided. A predictive data model is displayed based on the user query. Provenance and evidence is provided based on a user selected result. The ground truth dataset is modified in response to receiving a user action via the user interface.

17 Claims, 6 Drawing Sheets

(51) Int. Cl.
*G06N 5/02* (2006.01)
*G06F 16/338* (2019.01)
*G06F 16/215* (2019.01)
*G06F 16/28* (2019.01)

(58) Field of Classification Search
CPC .. G06F 16/3347; G06F 16/54; G06F 16/5838; G06F 17/16; G06F 40/20; G06F 16/215; G06F 16/2228; G06F 16/245; G06F 16/24575; G06F 16/288; G06F 16/9035; G06F 16/906; G06F 30/20; G06F 3/011; G06F 3/014; G06F 3/015; G06F 3/016; G06F 3/017; G06F 40/205; G06F 16/955; G06F 16/434; G06F 16/335; G06F 16/40; G06F 16/437; G06F 3/04842; G06F 15/16; G06F 16/23; G06F 7/14; G06F 11/3495; G06F 16/1734; G06F 40/226; G06F 16/90332; G06F 40/169; G06F 16/93; G06F 16/221; G06F 16/235; G06F 16/2386; G06F 16/24558; G06F 16/2477; G06F 16/176

See application file for complete search history.

(56) References Cited

U.S. PATENT DOCUMENTS

| | | | |
|---|---|---|---|
| 2016/0065597 A1* | 3/2016 | Nguyen | H04L 63/1408 726/22 |
| 2017/0068906 A1* | 3/2017 | Korycki | G06Q 10/107 |
| 2018/0082183 A1* | 3/2018 | Hertz | G06Q 10/10 |
| 2018/0285340 A1* | 10/2018 | Murphy | G06F 40/295 |
| 2019/0035099 A1* | 1/2019 | Ebrahimi Afrouzi | G06T 7/0002 |
| 2019/0278844 A1* | 9/2019 | Brixey | G06F 3/04842 |

* cited by examiner

Mianserin – Parkinson Disease (confidence score of 38%)

Known drug-disease pairs similar to Mianserin – Parkinson's disease

Detailed features of Mianserin – abnormal movement

| Drug | Disease 415 | Citations 420 | Score 425 | | Name | Value | Std Vlaue | Weight |
|---|---|---|---|---|---|---|---|---|
| ⦿ Mianserin | abnormal movement | 2 supporting publications including:... | 116.48 ← 410 | | [feature name] | 0.67 | 2.36 | 0.0877 |
| ○ Mirtazapine | Parkinson's Disease | 5 supporting publications including... | 58.03 | | [feature name] | 0.67 | 2.36 | 0.0778 |
| | | | | | [feature name] | 0.67 | 2.37 | 0.0588 |
| ○ (3-(10H,11H-dibenzo[a,f]azepin-5-yl)dimethylamine,chloride | Parkinson's Disease | 2 supporting publications including... | 38.60 | | ... | | | |
| | | | | | [feature name] | 0.67 | 2.40 | 0.0268 |

FIG. 4

DATA CURATION ON PREDICTIVE DATA MODELLING PLATFORM

BACKGROUND

Embodiments of the invention generally relate to computer systems, and more specifically to predictive data modelling platforms and their user interfaces.

Predictive models are built by synthesizing massive public and private datasets in both structured and unstructured formats. Natural language processing enables the predictive modelling platform to read millions of pages of public and private datasets to understand the contextual meaning of the parts of speech in the text. The resulting ground truth forms the basis for supervised training of predictive models.

An easy and efficient approach to curate the ground truth in a targeted way can improve data models and result in more accurate predictions.

SUMMARY

Among other things, a method for a data modelling platform to engage with a user via a user interface is provided. The method includes modifying a ground truth dataset in response to receiving a user action via the user interface, the user action being provided in response to providing to the user, via the user interface, provenance information of a truth relation of at least one entity pair.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 4 is an illustrative GUI 400 of predictive data modelling platform 100 of FIG. 1 for engaging with a user to execute some operational steps of the method of FIGS. 2A-2C based on receiving at least one user action via GUI 300 of FIG. 3, according to an embodiment of the invention;

DETAILED DESCRIPTION

Figure 1:
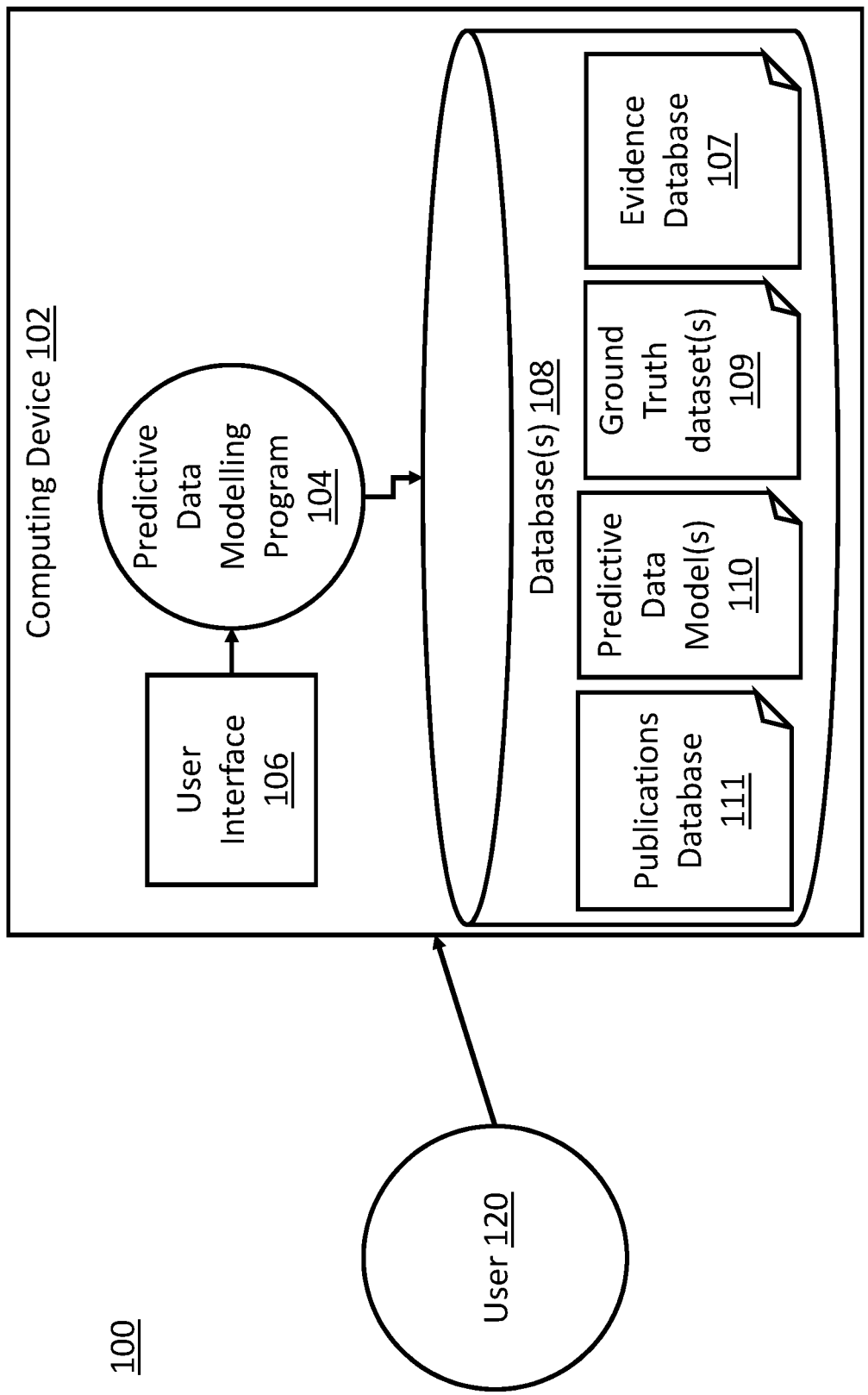
FIG. 1 is a functional block diagram of an illustrative predictive data modelling platform 100, according to an embodiment of the invention.

It shall be apparent to a person of ordinary skill in the art that although discussions of embodiments of the invention may refer to "predicting relationships between a disease and a drug" (or other entity types), embodiments of the invention improve the technical field of computerized predictive data modelling platforms and predictive data modelling processes. In other words, the issue addressed by embodiments of the invention is not "whether a drug and a disease are related", but rather, "how can computers and computer-implemented processes predict drug-disease relationships". Therefore, embodiments of the invention are directed to technical challenges of using computing systems to make, analyze, and predict drug-disease relations (and more broadly, entity relationships).

Some prior art predictive data modelling platforms generate predictive data models by synthesizing massive public and private datasets, in both tabular (structured) and unstructured formats, to arrive at ground truths. A ground truth may be defined, in one instance, as a relationship between at least two natural language components (and contextual meanings of those components and their relationships), that are extracted based on characteristics observed in structured, unstructured, or mixed data used in a training process.

Discussions of embodiments of the invention may refer to one or more of the following terms, each of which is recited below together with an illustrative and non-limiting definition.

Structured—refers to data that resides in a fixed field within a record or file. For example, this includes data contained in relational databases and spreadsheets.

Unstructured—includes documents, such as scientific articles, clinical trial data, electronic lab notes, toxicology reports, patents, and other proprietary data.

Entity—a natural language component, often extracted from natural language text using a natural language processing algorithm. An entity may have the capacity to relate to another entity, and may, for example, refer to a person, thing, place, or time. Information about entities can include their relationship, connection, or association (for example, X is related to Y; X causes Y; X cures Y; etc.). Entity relationships may have many characteristics such as type, strength, and temporality. Other entity types are possible.

Confidence Score—a measurement of confidence that an asserted relationship between two entities exists. A confidence score may be represented in many ways, including a percentage value or a floating-point value between 0 and 1.

Ground truth—a known or observed relationship between at least two entities. The ground truth may also illustrate known or observed contextual meanings entities and/or their relationships.

Relation—a connection or association between at least two entities. An entity's relation to another entity can be represented using metadata. A relation can have many characteristics, including type, strength, and temporality (among other characteristics).

Prediction—a determination made using a predictive data model that indicates a relationship exists between two entities. A prediction usually applies to a previously unknown or unobserved relationship. Whether a relationship is unknown or unobserved is defined relative to a predictive data model; the relationship is unknown if its existence is not used in an initial training of a predictive data model. The prediction may be derived by using the model using additional data sets. The relationship may be known or unknown in other contexts and relative to other models. A prediction may have an associated confidence score.

Provenance—source information about a predicted association between two entities as reflected in a ground truth dataset. The source information may be the ground truth itself, or the documentary source of the predicted association. In the case of the latter, provenance refers to an electronic document source (or a portion of that document) containing an explanation that influences a predictive data modelling process' assertion that two entities are related (i.e., documentary source evidencing the ground truth).

Explanation—electronic information (for example, text) extracted from an evidence source (such as a document) that influences a predictive data modelling process' assertion that two entities are related and informs an associated confidence score of that assertion. For example, an explanation of a ground truth may include text expressing facts that support that ground truth. The evidence may have associated levels of trust; some evidence sources or types may be more trustworthy than others, and may contribute differently to confidence scores of corresponding ground truths.

Prediction task—an electronic workflow for determining whether two entities are related, where the workflow includes using a predictive data model to arrive at the determination.

As described above, some prior art predictive data modelling platforms generate predictive data models by synthesizing massive public and private datasets, in both tabular and unstructured formats, to arrive at ground truths. A ground truth may be defined, in one instance, as a relationship between at least two natural language components, and contextual meanings of those components and their relationships, extracted based on characteristics observed in structured, unstructured, or mixed data.

For example, a predictive data modelling platform may provide mechanisms for processing millions of unstructured data documents, such as scientific articles, clinical trial data, electronic lab notes, toxicology reports, patents, and other proprietary data. On the other hand, structured data can refer to data that resides in a fixed field within a record or file. For example, this includes data contained in relational databases and spreadsheets.

As part of this mechanism, the predictive data modelling platform may provide functions for understanding natural language components and comprehending their contextual meaning, to arrive at one or more ground truths.

Supervised training of predictive models is based on ground truths extracted from structured and unstructured data. In known processes, there is no easy and efficient way for a user to curate the ground truths in a targeted way to improve the predictions made by the generated predictive models. According to at least one embodiment of the invention, users can engage with the computing system to detect or generate ground truths and resulting predictive models in a targeted way that can improve the predictions made by those models. In the at least one embodiment, the process may be informed by use of and engagement with explanation and provenance data.

For example, one type of a supervised approach is active learning. However, the focus of the active learning approach is to determine which subset of unlabeled data (i.e., data that is not part of a ground truth) should be explicitly labeled by a user so as to be included in the ground truth. At least one embodiment of the present invention, on the other hand, improves the ground truth itself.

Another difference between the active learning approach and at least one embodiment of the invention is that the active learning approach is not based on explanation and provenance data that the at least one embodiment of the invention leverages.

According to at least one embodiment of the invention, a user interface provides a user with the ability to iteratively improve a predictive model by modifying a ground truth based on receiving, from the system, explanation and provenance data associated with predictions generated by the predictive model. Accordingly, embodiments of the invention improve the operation of predictive data modelling operations on a computing device in a manner not possible by mere human activity, or a mental process. More specifically, the conferred benefits and improvements relate to performing these tasks on a computing device.

According to at least one embodiment of the invention, the computing device provides the user with an option to exclude, in a targeted way, the relations between two concepts or entities that either are incorrect (for example, due to an inaccuracy of an underlying NLP process), or are irrelevant for a given prediction task. The resulting predictions generated by this process will be of higher quality and accuracy. The process can be integrated into an artificial intelligence (AI) reasoning system. This allows user to interact with and modify a subset of a ground truth dataset in which the user is best qualified. Because user is engaged with the ground truth dataset in a task of interest (e.g., a drug-disease relationship), the researchers would be curating the ground truth dataset by applying real-world experience, as opposed to applying speculative knowledge (e.g., only from reading journals).

Embodiments of the invention will now be described in more detail in connection with the Figures.

FIG. 1 is a functional block diagram of an illustrative predictive data modelling platform (platform) 100, according to an embodiment of the invention.

The platform 100 includes functional components each of which may be, singularly or collectively, a computer device or a component thereof as described in connection with FIG. 6, below. For example, the platform 100 may be deployed on one or more computing devices 102 communicating over a network to execute functional steps of a predictive data modeling program (program) 104 in communication with a user 120 via a user graphic interface (GUI) 106. The program 104 includes programming instructions executable by a processor of computing device 102. In some embodiments, programming instructions of the program 104 may be distributed or duplicated on various computing devices 102 communicating in a networked environment. Additionally, the programming instructions of the program 104 may invoke various application programming interfaces (APIs) which are exposed by various data repositories. Data accessed through the APIs may be ingested by the program 104 to create the model 110.

With continued reference to FIG. 1, the platform 100 further includes one or more databases 108 that store one or more predictive data models (model) 110 and one or more ground truth dataset 109. In various embodiments, the database 108 may include an evidence database 107 containing the evidence on which a confidence score is based. The evidence can include a technical article, and an abstract from a paper, or a portion of a technical treatise, for example. In some embodiments, the structured and unstructured data that are input to creating a model 110 may be stored in a database, such as a publications database 111. This may be the case when the platform 100 subscribes to a data feed from one or more data repositories, such as those maintained by the U.S. at the National Center for Biotechnology Information. In that case, local storage of pertinent data at the platform 100 tends to enhance responsiveness of the program 104 to the user by reducing the number of network accesses required to generate and display the model 110.

Figure 2:
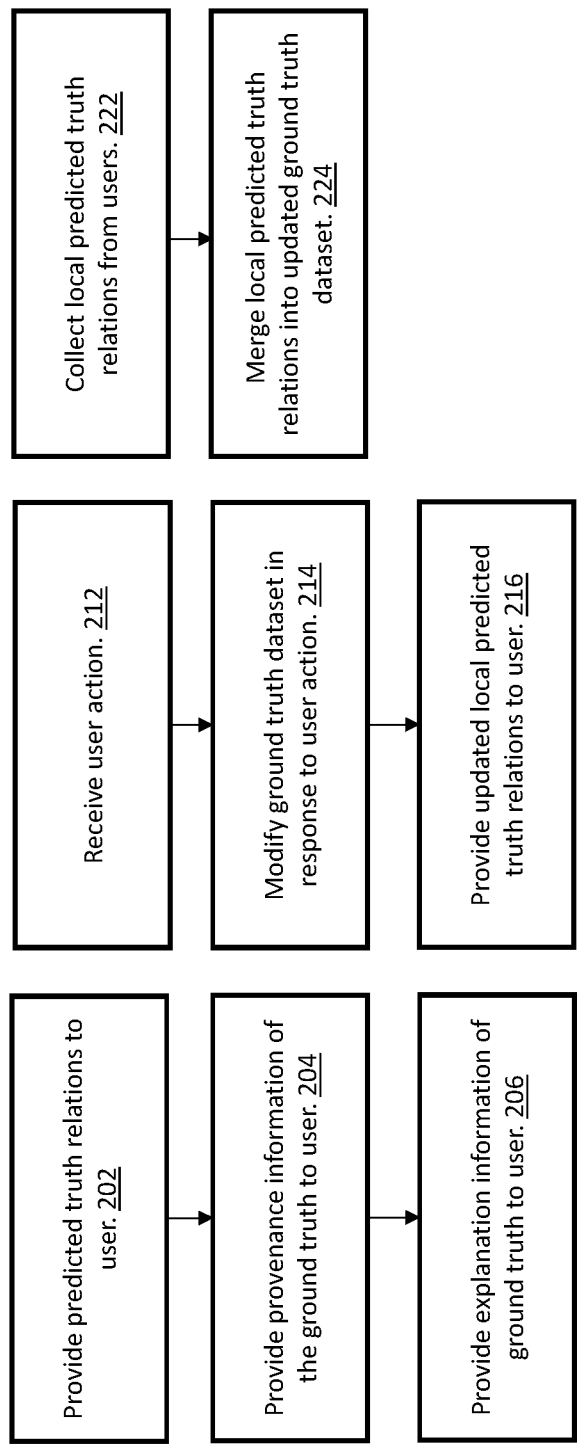
FIGS. 2A-2C are flowcharts of operational steps of methods executable on predictive data modelling platform 100 of FIG. 1, according to an embodiment of the invention.

FIG. 2A is a flowchart of operational steps of a method executable on the platform 100 of FIG. 1, according to an embodiment of the invention.

FIG. 2A assumes the predictive data model (e.g., a knowledge graph) is already built, according to any known algorithm suitable for building a predictive data model.

At 202, the user accesses the model 110 through the GUI 106. In response to the user entering a query, the GUI 106 displays the model 110 as the list of truth relations that are the known or observed relationship between at least two entities. In this case, one of the entities is the user query. The displayed list includes the entities which, with the user query, comprise the truth relation. The displayed list of predicated truth relations may include a confidence score for each entity, indicating the strength of the relationship between the user query and each displayed entity.

At 204, in response to the user selecting an entity item from the displayed list of truth relations, the program 110 displays the provenance about the ground truth relation between the user query and the selected entity item. The provenance may be source information, the ground truth itself, or the documentary source of the predicted association. In the case of the latter, provenance refers to an electronic document source (or a portion of that document) containing an explanation that influences a predictive data modelling process' assertion that two entities are related (i.e., documentary source evidencing the ground truth). More than one provenance entry may be displayed, along with a score. The score indicates the strength of the relation between the provenance entry and the selected entity item. For example, patterns of co-occurrence of terms in a text corpus may indicate the idiomatic expression which may increase the strength of the relation.

At 206, in response to the user selecting an entity item from the displayed list of provenance information, the program 110 displays the explanation about the ground truth relation between the user query and the selected entity item. The explanation may be considered the evidence of why the provenance of the entity item relates to the user query.

FIG. 2B is a flowchart of operational steps of a method executable on the platform 100 of FIG. 1, according to an embodiment of the invention.

FIG. 2A displays the model 110. However, in FIG. 2B the user can curate the ground truth relations displayed in FIG. 2A. This allows a user to interact and modify a subset of the ground truth dataset 109 in which the user is best qualified because the user is engaged in a task of interest.

In 212, the program 104 receives user action. The user may enter a value that will be input to an algorithm to update the confidence score field of an entity item from the displayed list of truth relations, as displayed in step 202 of FIG. 2A. The value may indicate the user's complete agreement with the ground truth relation between the query and the entity, for example, "100", "1", or "yes". Similarly, "0", or "no" may indicate complete disagreement. An appropriate value may be configured to indicate sentiment in between that adjusts the confidence score up or down. Additionally, the algorithm may weight the input value according to a user's profile, which may include the user's expertise or familiarity in the subject, and the user's function, such as researcher or student.

In 214, the program 104 modifies the ground truth dataset 109 in response to the user action. The confidence score may be calculated as a multivariable function, $f(x)$, where x is percentage association for ground truth prediction. The variables may include whether the user, through knowledge or experience, agrees that the relations in the ground truth prediction are associated, whether the entities in the ground truth relation co-occur in the same document, or if not, the distance (i.e., vertices and edges) between them. In terms of the model 110, changing the confidence score may result in a new model 110. In terms of a knowledge graph, changing the confidence score may result in breaking or adding one or more links between vertices in the knowledge graph.

At 216, the updated model 110 having the updated truth relations is displayed to the user. This updated model is local to the user, and may be stored on the user's computing, device or in a database 108 on a computing device 102 of the platform 100. In this context, the updated model is local, not only in storage, but in that the user modifies only a subset of the ground truth dataset 109 in which the user is best qualified.

FIG. 2C is a flowchart of operational steps of a method executable on the platform 100 of FIG. 1, according to an embodiment of the invention.

In FIG. 2C, at 222 the program 104 collects from the users, the local updated models 110 having the updated truth relations. The collection may occur periodically at a preconfigured time interval. Alternatively, the user may periodically push his updates to the program 104, or withhold sending updates until the user ends the session. Since many users may be curating the model 110, providing local views tends to reduce performance demands on the platform 100.

Finally, at 224, the program 104 merges the collected local updated models into the model 110. Updating the model 110 may be accomplished according to any known algorithm suitable for building a predictive data model.

Figure 3:
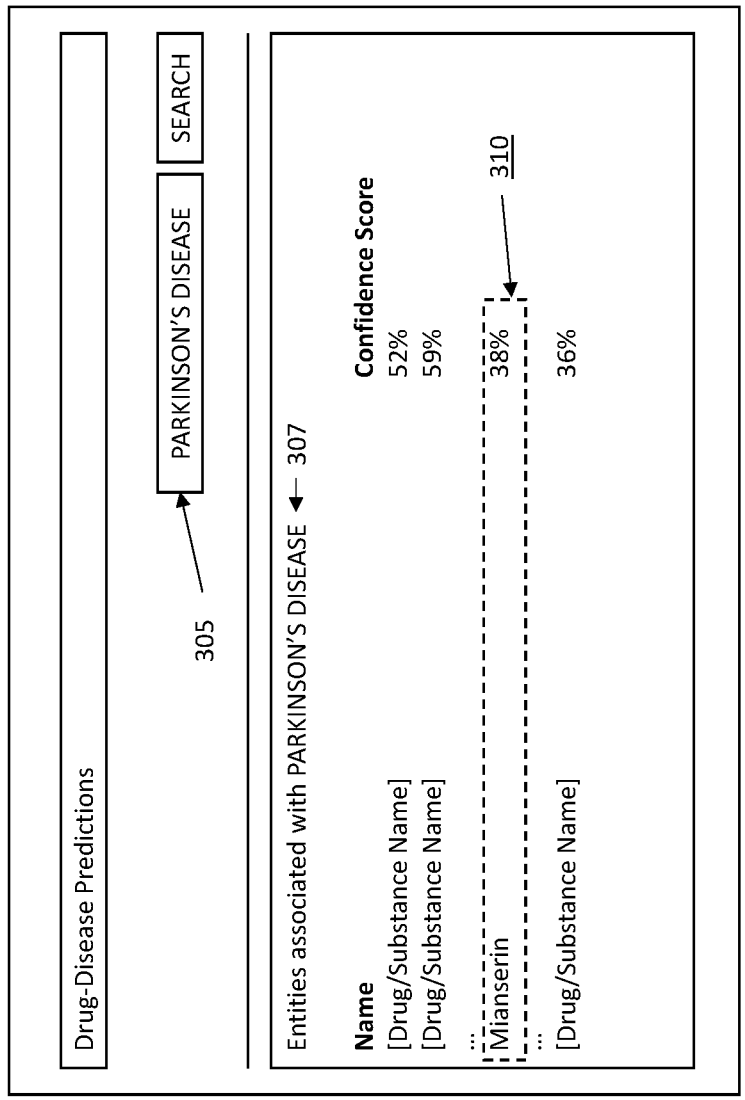
FIG. 3 is an illustrative graphical user interface (GUI) 300 of the predictive data modelling platform 100 of FIG. 1 for engaging with a user to execute some operational steps of the method of FIGS. 2A-2C, according to an embodiment of the invention.
Figure 5:
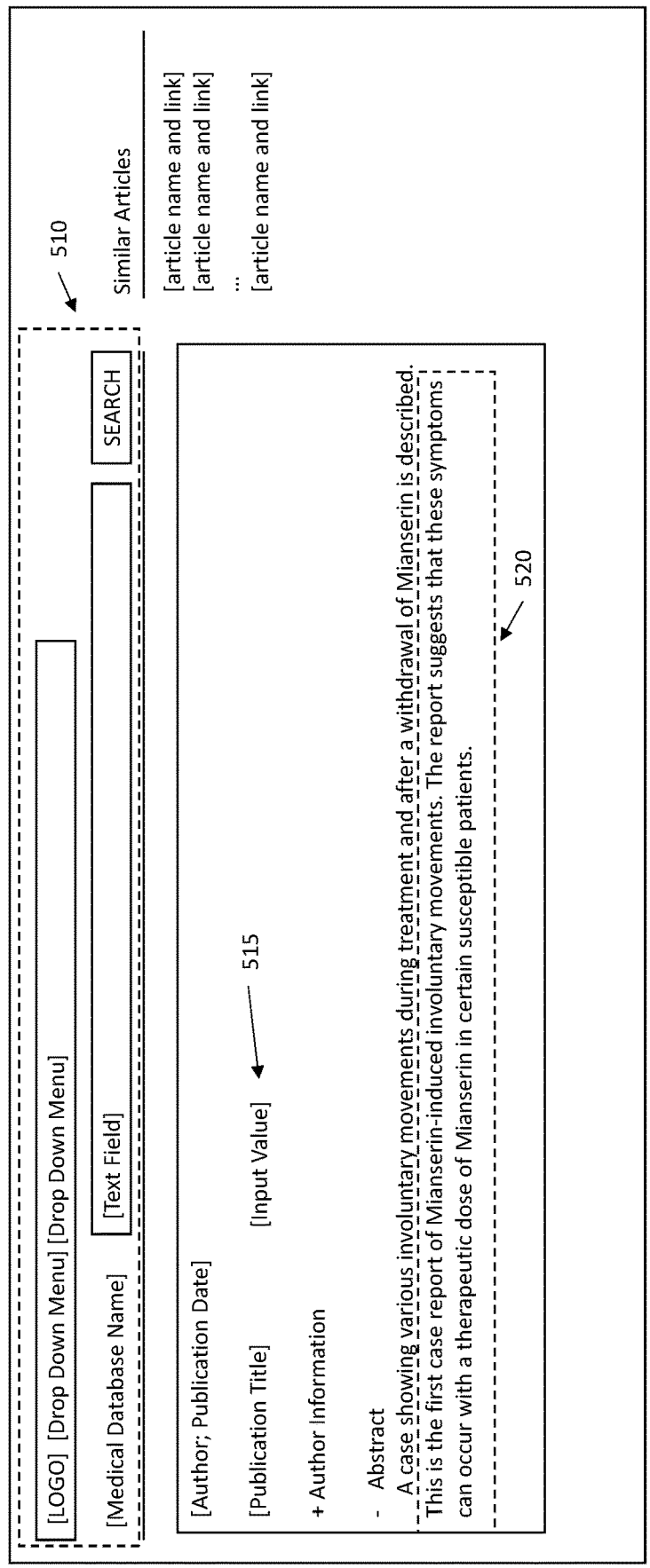
FIG. 5 is an illustrative GUI 500 of predictive data modelling platform 100 of FIG. 1 for engaging with a user to execute some operational steps of the method of FIGS. 2A-2C based on receiving at least one user action via GUI 400 of FIG. 4, according to an embodiment of the invention.

FIGS. 3-5 illustrate a graphical user interface (GUI) 300 of the predictive data modelling platform 100 of FIG. 1 for engaging with a user to execute some operational steps of the method of FIGS. 2A-2C, according to an embodiment of the invention. Although the example illustrates drug-disease prediction, embodiments of the invention also apply to other fields of endeavor where researching and curating the data model is supported by provenance and evidence (e.g., law). These figures illustrate an example where a user accesses the model 110 to search for drugs that the model 110 predicts might treat a disease. Here, the user enters the desired query, for example, Parkinson's disease, in the search box 305. In response, the program 104 displays a list of drugs 307 predicted to treat Parkinson's, along with an associated confidence score indicating the strength of the relation between the drug and disease. In the example, the user selects the entry 310 corresponding to Mianserin.

FIG. 4 illustrates a display when the user is interested in the provenance associated with the entry selected in FIG. 3. The terms of interest are labelled. In the example, there are three known drug-disease pairs (truth relations) associated with the disease, Parkinson's. The column, disease 415, includes a general note about the drug-disease pair. Here, the evidence suggests a negative association between Mianserin and Parkinson's disease. Mianserin appears to be contraindicated for Parkinson's disease. The column, citations 420, indicates how many publications provide provenance for the drug-disease pair relation. The column, score 425, indicates the overall relevance of the citations to the drug-disease pair. Factors that contribute to the score include co-occurrence of the entities in the relation. For example, appearing within the same paragraph or sentence may weigh more heavily in calculating the score, while those entities separated by several paragraphs or chapters may lower the score. To learn more about the relation between Mianserin and Parkinson's disease the user may select the entry 410 because the entry contains the highest weighted supporting evidence for the prediction.

FIG. 5 illustrates the resulting display when a user makes a selection from the display of FIG. 4. Upon selecting the entry 410, the program 104 displays the supporting evidence for the prediction. The citations indicate a negative association between Mianserin and Parkinson's disease, since the symptoms of the disease may worsen if the drug is administered as treatment. The user may enter an input value 515, discussed previously with respect to FIG. 2B, to curate the ground truth by removing the association between Mianserin and Parkinson's disease. This operation is referred to as a targeted curation.

To create the model 110, the platform 100 may subscribe to, purchase, or license, data feeds from proprietary and/or public data sources, such as PubMed.gov, whereby data is periodically pushed from the data source to the platform 100. Alternatively, the platform 100 may periodically ingest data from the data sources. The program 104 initially displays the stored model 110 in the GUI 106 (in FIG. 3). However, to display a selection's provenance (FIG. 4) and evidence (FIG. 5) the platform 100 may access data that is stored extraneously to the platform 100, such as medical data provided by PubMed.gov, or other similar data sources. One way to accomplish this is to redirect the user to the required website. In that case the header 510 will change, to reflect the web page of the external data source. Alternatively, the GUI 106 may act as a web portal by providing a GUI 106 with a consistent and uniform look and feel, even though the data may originate from somewhere other than from the platform 100. In this case, the header 510 will be that of the platform 100.

Figure 6:
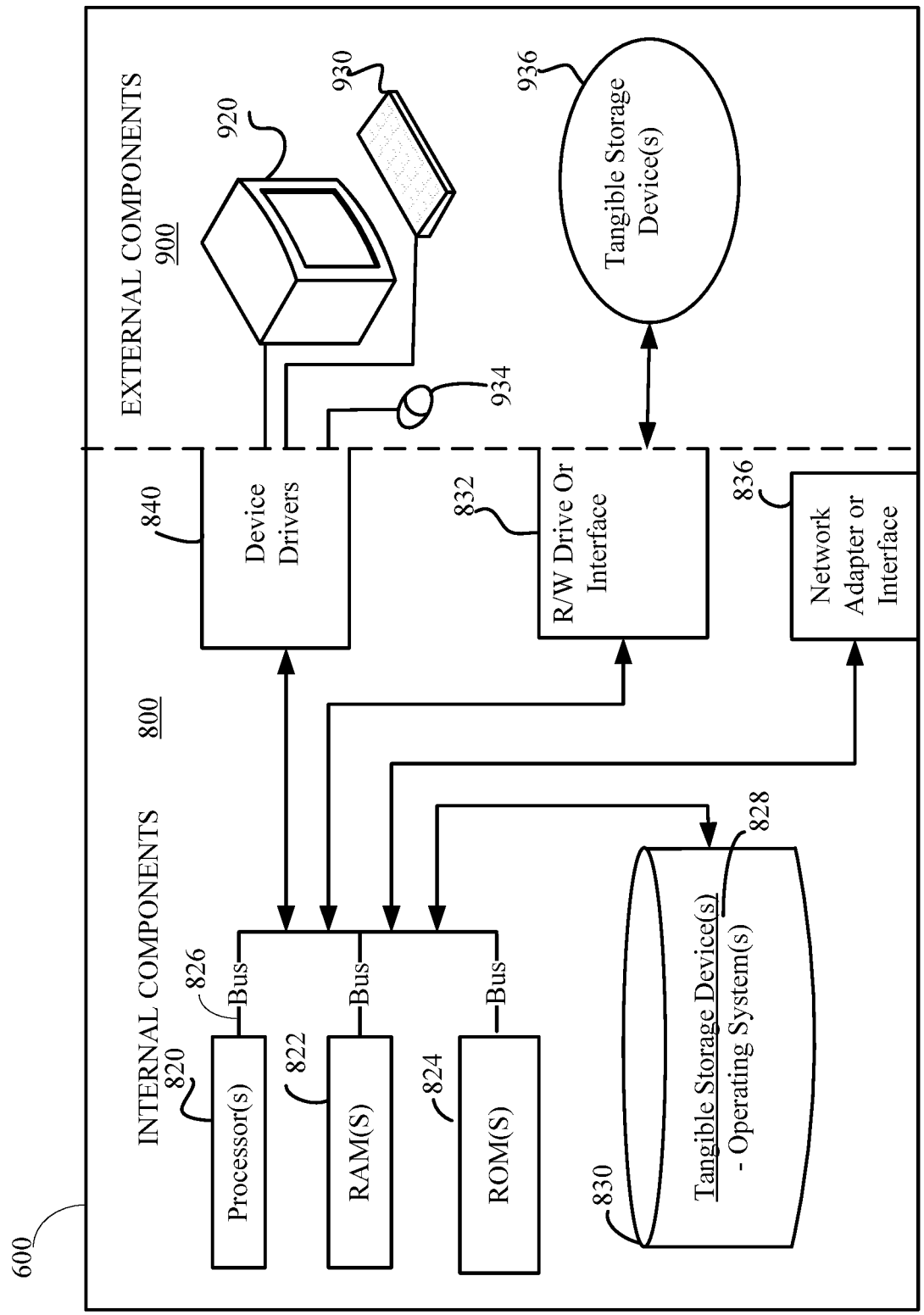
FIG. 6 is an illustrative functional block diagram of a computing device for implementing aspects of the predictive data modelling platform of FIG. 1 to execute the method of FIGS. 2A-2C and to provide GUI 300 of FIG. 3, GUI 400 of FIG. 4, and GUI 500 of FIG. 5, according to an embodiment of the invention.

FIG. 6 illustrates an exemplary computing device 600 applicable for executing the algorithm of FIGS. 2A-2C. Computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the four-corner stroke movement algorithm, as illustrated in FIG. 3; and one or more computer-readable tangible storage devices 830. The one or more operating systems 828 and the components of the four-corner stroke movement algorithm 829 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, USB memory stick, and magnetic disk.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836.

External components 900 can also include a touch screen 920 and pointing devices 930. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for a data modelling platform to engage with a user via a user interface, the method comprising:
    receiving a query from the user;
    displaying a list of ground truth relations for a predictive data model to the user, wherein each ground truth relation is a predicted relationship between the received query and an entity, and wherein the displayed list of ground truth relations includes the entity and a confidence score for each entity;
    in response to the user making a selection from the displayed list of ground truth relations, retrieving a stored provenance about the predicted relationship between the received query and the selection, wherein the stored provenance comprises a documentary source that includes an explanation of the predicted relationship between the received query and the selection;
    displaying the explanation of the predicted relationship between the received query and the selection;

in response to the user providing a sentiment based on the explanation, updating the confidence score by combining the sentiment and the confidence score;

updating the predictive data model by modifying the list of ground truth relations based on the updated confidence score; and periodically collecting predictive data model updates from the user and merging the collected predictive data model updates into an updated predictive data model.

2. The method of claim 1, further comprising:

displaying a second entity predicted to be related to a first entity based on the received query and the predictive data model, wherein the query includes text defining the first entity.

3. The method of claim 2, further comprising:

displaying the confidence score reflecting a strength of a relationship between the first entity and the second entity.

4. The method of claim 2, further comprising:

in response to receiving an interaction, from the user, with a graphical component of a user interface indicating the provenance of the predicted relationship, communicating to the user, via the user interface, the explanation of the predicted relationship between the first entity and the second entity.

5. The method of claim 4, wherein receiving the interaction, from the user, with the graphical component of the user interface comprises:

providing instructions to display to the user, via the graphical component of the user interface, the provenance of the predicted relationship; and receiving from the user, via the graphical component of the user interface, a selection of the provenance.

6. The method of claim 1, wherein a machine learning model is used to predict the relationship between the received query and the entity.

7. The method of claim 6, further comprising:

updating the machine learning model iteratively based on modifications to the list of ground truth relations in response to one or more user interactions via the user interface.

8. The method of claim 1, wherein modifying the list of ground truth relations comprises:

removing a ground truth relation from the displayed list of ground truth relations based on the user indicating a negative relationship between the received query and the entity.

9. The method of claim 1, wherein modifying the list of ground truth relations comprises:

modifying the confidence score based on the user indicating a negative relationship, a positive relationship, or a neutral relationship between the received query and the entity.

10. The method of claim 1, further comprising:

curating the list of ground truth relations relative to a user-defined prediction task of interest.

11. The method of claim 1, wherein retrieving the stored provenance about the predicted relationship between the received query and the selection comprises:

identifying at least two predicted relationships for communication to the user; and retrieving stored provenance information of a filtered subset of the at least two predicted relationships.

12. A computer program product for a data modelling platform to engage with a user via a user interface, the computer program product comprising a non-transitory tangible storage device having program code embodied therewith, the program code executable by a processor of a computer to perform a method, the method comprising:

receiving a query from the user;

displaying a list of ground truth relations for a predictive data model to the user, wherein each ground truth relation is a predicted relationship between the received query and an entity, and wherein the displayed list of ground truth relations includes the entity and a confidence score for each entity;

in response to the user making a selection from the displayed list of ground truth relations, retrieving a stored provenance about the predicted relationship between the received query and the selection, wherein the stored provenance comprises a documentary source that includes an explanation of the predicted relationship between the received query and the selection;

displaying the explanation of the predicted relationship between the received query and the selection;

in response to the user providing a sentiment based on the explanation, updating the confidence score by combining the sentiment and the confidence score;

updating the predictive data model by modifying the list of ground truth relations based on the updated confidence score; and periodically collecting predictive data model updates from the user and merging the collected predictive data model updates into an updated predictive data model.

13. A computer system for a data modelling platform to engage with a user via a user interface, comprising:

receiving a query from the user;

displaying a list of ground truth relations for a predictive data model to the user, wherein each ground truth relation is a predicted relationship between the received query and an entity, and wherein the displayed list of ground truth relations includes the entity and a confidence score for each entity;

in response to the user making a selection from the displayed list, retrieving a stored provenance about the predicted relationship between the received query and the selection, wherein the stored provenance comprises a documentary source that includes an explanation of the predicted relationship between the received query and the selection;

displaying the explanation of the predicted relationship between the received query and the selection;

in response to the user providing a sentiment based on the explanation, updating the confidence score by combining the sentiment and the confidence score;

updating the predictive data model by modifying the list of ground truth relations based on the updated confidence score; and periodically collecting predictive data model updates from the user and merging the collected predictive data model updates into an updated predictive data model.

14. The computer system of claim 13, further comprising:

displaying a second entity predicted to be related to a first entity based on the received query and the predictive data model, wherein the query includes text defining the first entity.

15. The computer system of claim 14, further comprising:

displaying the confidence score reflecting a strength of a relationship between the first entity and the second entity.

16. The computer system of claim 14, further comprising:

in response to receiving an interaction, from the user, with a graphical component of a user interface indicating the provenance of the predicted relationship, communicating to the user, via the user interface, the explanation of the predicted relationship between the first entity and the second entity.

17. The computer system of claim 13, wherein modifying the list of ground truth relations comprises:
  removing a ground truth relation from the displayed list of ground truth relations based on the user indicating a negative relationship between the received query and the entity; and
  modifying the confidence score based on the user indicating the negative relationship, a positive relationship, or a neutral relationship between the received query and the entity.

* * * * *